United States Patent
Danskin

(10) Patent No.: US 9,727,463 B2
(45) Date of Patent: Aug. 8, 2017

(54) ASSYMETRIC COHERENT CACHING FOR HETEROGENEOUS COMPUTING

(71) Applicant: Nvidia Corporation, Santa Clara, CA (US)

(72) Inventor: John Danskin, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 71 days.

(21) Appl. No.: 14/882,617

(22) Filed: Oct. 14, 2015

(65) Prior Publication Data

US 2016/0342513 A1 Nov. 24, 2016

Related U.S. Application Data

(60) Provisional application No. 62/165,751, filed on May 22, 2015.

(51) Int. Cl.
| | |
|---|---|
| *G06F 12/08* | (2016.01) |
| *G06F 12/0811* | (2016.01) |
| *G06F 12/0804* | (2016.01) |
| *G06F 12/0888* | (2016.01) |
| *G06F 12/0837* | (2016.01) |

(52) U.S. Cl.
CPC ...... *G06F 12/0811* (2013.01); *G06F 12/0804* (2013.01); *G06F 12/0837* (2013.01); *G06F 12/0888* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 4,429,363 | A * | 1/1984 | Duke | G06F 12/0866 711/122 |
| 8,738,860 | B1 * | 5/2014 | Griffin | G06F 12/0897 711/122 |
| 2008/0104329 | A1 * | 5/2008 | Gaither | G06F 12/0888 711/138 |

(Continued)

OTHER PUBLICATIONS

"Weak Ordering—A New Definition", Santa V. Adve, et al., Computer Sciences Department, University of Wisconsin, IEEE, 1990, pp. 2-14.

(Continued)

*Primary Examiner* — Kaushikkumar Patel
(74) *Attorney, Agent, or Firm* — Rich Domingo; Parker Justiss, P.C.

(57) ABSTRACT

A method of caching data in the memory of electronic processor units including compiling, in a first processor configured to perform data-parallel computation, a set of asymmetric coherent caching rules. The set of rules configure the first processor to be: inoperable to cache, in a second level memory cache of the first electronic processor unit, data whose home location is in a final memory store of a second electronic processor unit; operable to cache, in the second level memory cache of the first electronic processor unit, the data whose home location is in a final memory store of the first electronic processor unit; and operable to cache, in a first level memory cache of the first electronic processor unit, the data, regardless of a home location of the data.

20 Claims, 4 Drawing Sheets

(56) References Cited

U.S. PATENT DOCUMENTS

Figure 1A:
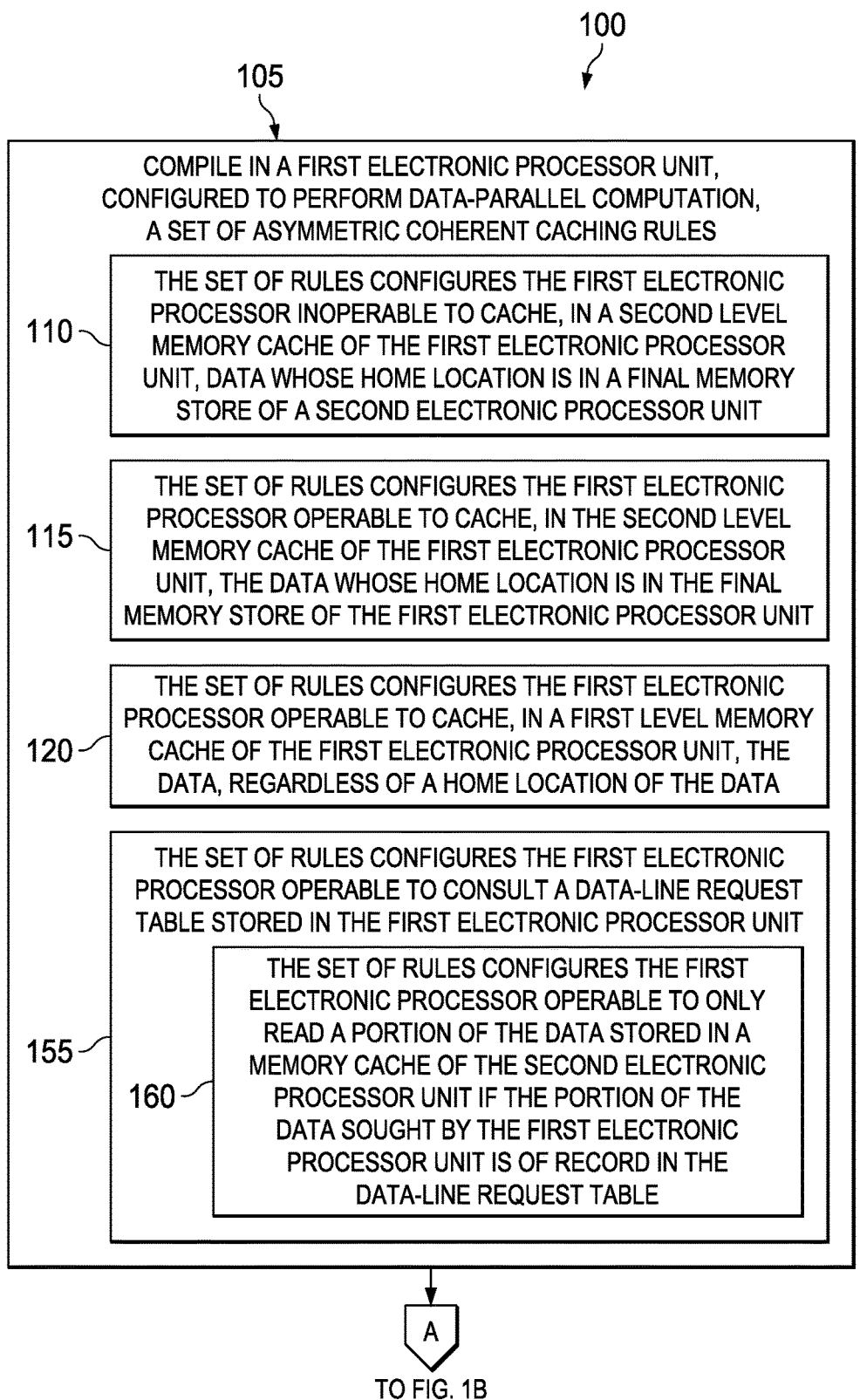

| | | | | |
|---|---|---|---|---|
| 2009/0182944 A1* | 7/2009 | Comparan | .......... | G06F 12/0888 711/122 |
| 2011/0161585 A1* | 6/2011 | Kottapalli | .......... | G06F 12/0817 711/122 |
| 2014/0310467 A1* | 10/2014 | Shalf | .................. | G06F 15/7825 711/119 |
| 2015/0254207 A1* | 9/2015 | Kessler | ................ | G06F 13/423 710/39 |

OTHER PUBLICATIONS

"A Survey of Cache Coherence Schemes for Multiprocessors", Per Stenstrom, Lund University, IEEE, 1990, pp. 12-24.

"Improving Multiprocessor Performance with Coarse-Grain Coherence Tracking", Jackson F. Cantin et al., Department of Electrical and Computer Engineering, University of Wisconsin Madison, IEEE, 2005, 12 pgs.

"Rodinia: A Benchmark Suite for Heterogeneous Computing", Shuai Che, et al., Department of Computer Science, University of Virginia, Sep. 2009, 11 pgs.

Hyper Transport I/O Link Specification, Revision 3.10c, Technical Document, Document No. HTC20051222-0046-0035, HyperTransport Consortium, May 6, 2010, Title and Contents pages of 443 page document; http://www.hypertransport.org/docs/twgdocs/htc20051222-0046-0035.pdf.

"SWEL: Hardware Cache Coherence Protocols to Map Shared Data onto Shared Caches", Seth H. Pugsley, et al., School of Computing, University of Utah, Sep. 2010, 11 pgs.

"Rigel: A 1,024-Core Single-Chip Accelerator Architecture", Daniel R. Johnson, et al., IEEE, 2011, pp. 30-41.

"SCD: A Scalable Coherence Directory with Flexible Sharer Set Encoding", Daniel Sanchez, et al., Stanford University, 2012, 12 pgs.

"Why On-Chip Cache Coherence is Here to Stay", Milo M.K. Martin, et al., vol. 55, No. 7, Jul. 2012, pp. 78-89.

"Heterogeneous System Coherence for Integrated CPU-GPU Systems", Jason Power, et al., Dec. 2013, 11 pgs.

"Architectural Support for Address Translation on GPUs", Bharath Pichai, et al., Mar. 2014, 15 pgs.

"Scaling the Power Wall: A Path to Exascale", Oreste Villa, et al., Nov. 2014, 12 pgs.

"Cuckoo Filter: Practically Better Than Bloom", Bin Fan, et al., Dec. 2014, 13 pgs.

"Unlocking Bandwidth for GPUs in CC-NUMA Systems", Neha Agarwell, et al., 2015, 12 pgs.

"NVLink, Pascal and Stacked Memory: Feeding the Appetite for Big Data", Denis Foley, 2015, 4 pgs.

"HSA Platform System Architecture Specification", HSA Foundation, Revision: Version 1.0 Final, Jan. 23, 2015, 69 pgs.

"Page Placement Strategies for GPUs within Heterogeneous Memory Systems", Neha Agarwal, et al., Mar. 2015, 12 pgs.

"New Nvidia Titan X GPU Powers Virtual Experience "Thief in the Shadows" at GDC", Justin Walker, Mar. 4, 2015, 5 pgs.

* cited by examiner

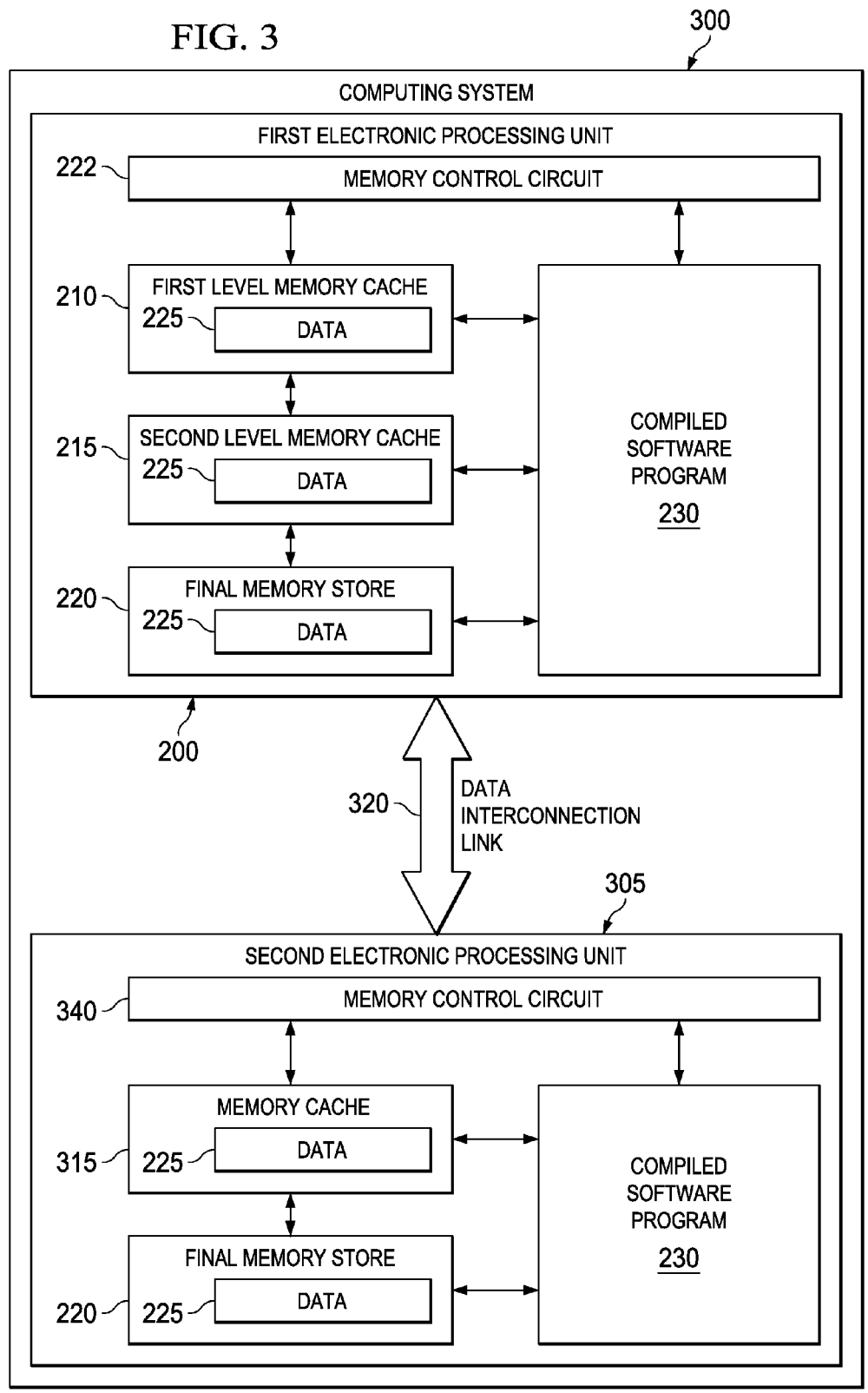

ASSYMETRIC COHERENT CACHING FOR HETEROGENEOUS COMPUTING

CROSS-REFERENCE TO RELATED APPLICATION

This application claims the benefit of U.S. Provisional Application Ser. No. 62/165,751, filed by John Danskin on May 22, 2015, entitled "ASSYMETRIC COHERENT CACHING FOR HETEROGENEOUS COMPUTING," commonly assigned with this application and incorporated herein by reference.

TECHNICAL FIELD

This application is directed, in general, to memory caching in electronic processing units and, more specifically, to methods for asymmetric coherent caching and computing systems operable with such memory-cached electronic processing units.

BACKGROUND

To increase performance and reliability, multiprocessor systems typically rely on cache coherence architectures to provide a consistent view of data stored in the separate cache memories of electronic processing units of the system. Present-day standards of cache coherence architectures often use protocols that are designed based on an assumption of electronic processing unit symmetry, meaning that all of the processing units of a multiprocessor systems have homogenous computing characteristics such as similar clock speeds and bandwidths. Cache coherent protocols that are based on such a symmetry assumption apply the same caching protocol to all of the processing units. MOESI or MOI strategies, well known to those skilled in the pertinent art, are examples of symmetric cache coherent protocols. A general principle of such protocols is that data should be migrated to, and owned by, the memory cache of the processor that last used the data.

Problems can arise in the use of such symmetric cache coherent protocols for multiprocessor systems where the assumption of processor symmetry does not apply. For instance, a first processor having a high bandwidth (e.g., a data throughput), due to the ability to perform extensive parallel processing on different portions of data, can greatly slow down the computational speed of a second processor if the two processors are sharing some of the data according to a symmetric cache coherent protocol.

SUMMARY

To mitigate these problems, one aspect provides a method of caching data in the memory of electronic processor units. The method can include compiling, in a first electronic processor unit configured to perform data-parallel computations, a set of asymmetric coherent caching rules. The set of rules can configure the first electronic processor unit to be inoperable to cache, in a second level memory cache of the first electronic processor unit, data whose home location is in a final memory store of a second electronic processor unit. The set of rules can configure the first electronic processor unit operable to cache, in the second level memory cache of the first electronic processor unit, the data whose home location is in a final memory store of the first electronic processor unit. The set of rules can configure the first electronic processor unit to be operable to cache, in a first level memory cache of the first electronic processor unit, the data, regardless of a home location of the data.

Another aspect provides an electronic processing unit for data-parallel computation. The electronic processing unit can include a first level memory cache, a second level memory cache, a final memory store and a memory control circuit a memory control circuit compiled with a set of asymmetric coherent caching rules. The set of rules can configure the electronic processing unit to be inoperable to cache, in the second level memory cache, data whose home location is in a final memory store of a second electronic processing unit. The set of rules can configure the electronic processing unit to be operable to cache, in the second level memory cache, the data whose home location is in the final memory store. The set of rules can configure the electronic processing unit to be operable to cache, in the first level memory cache, the data, regardless of a home location of the data.

Another aspect provides a computing system for data-parallel computations comprising an electronic parallel processing unit. The electronic parallel processing unit can include a first level memory cache, a second level memory cache, a final memory store and a memory control circuit compiled with the above-described set of asymmetric coherent caching rules.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Figure 1B:
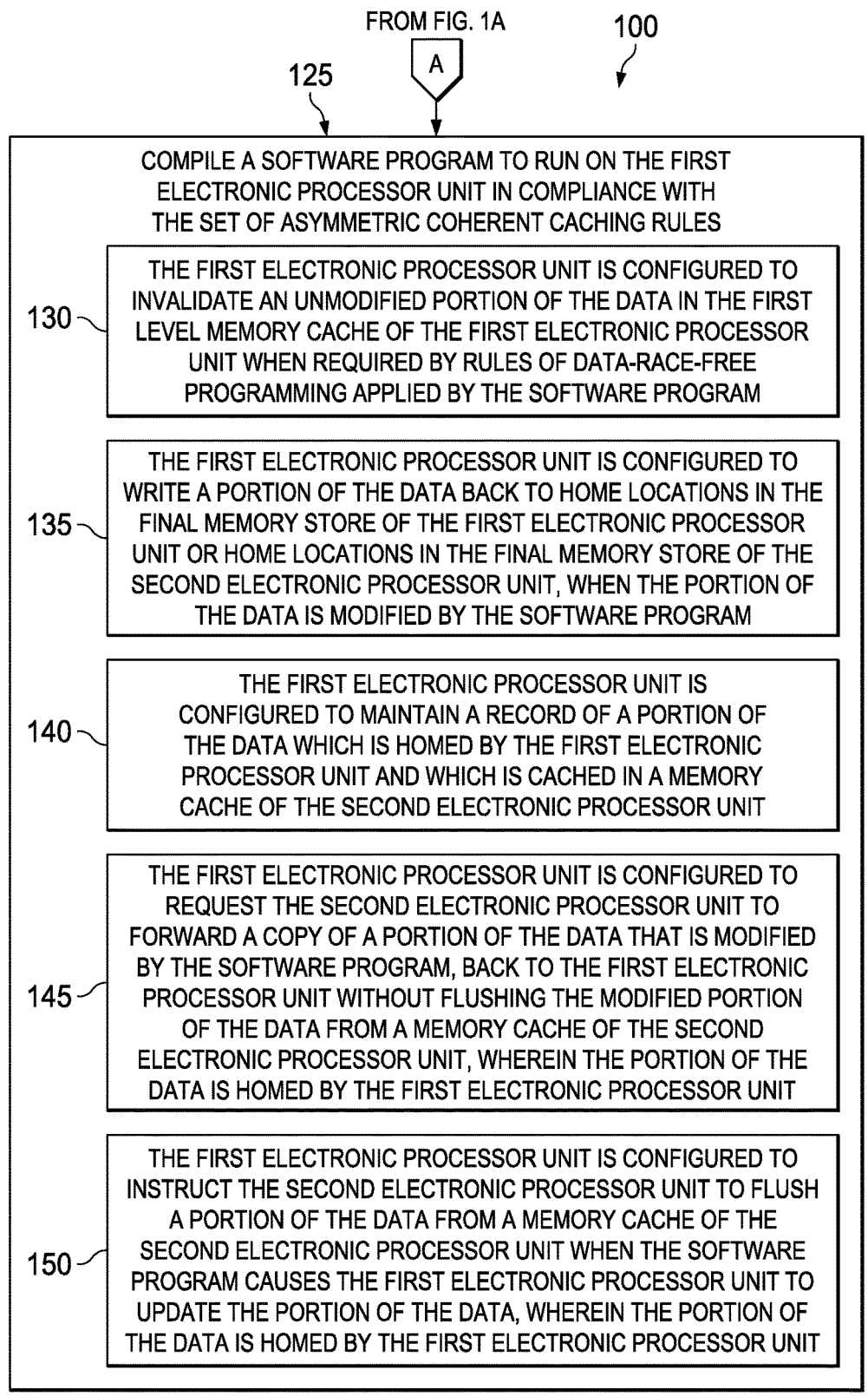

Reference is now made to the following descriptions taken in conjunction with the accompanying drawings, in which:

FIGS. 1A and 1B presents a flow diagram of example embodiments of a method of caching data in the memory of electronic processor units according to the principles of the present disclosure.

Figure 2:
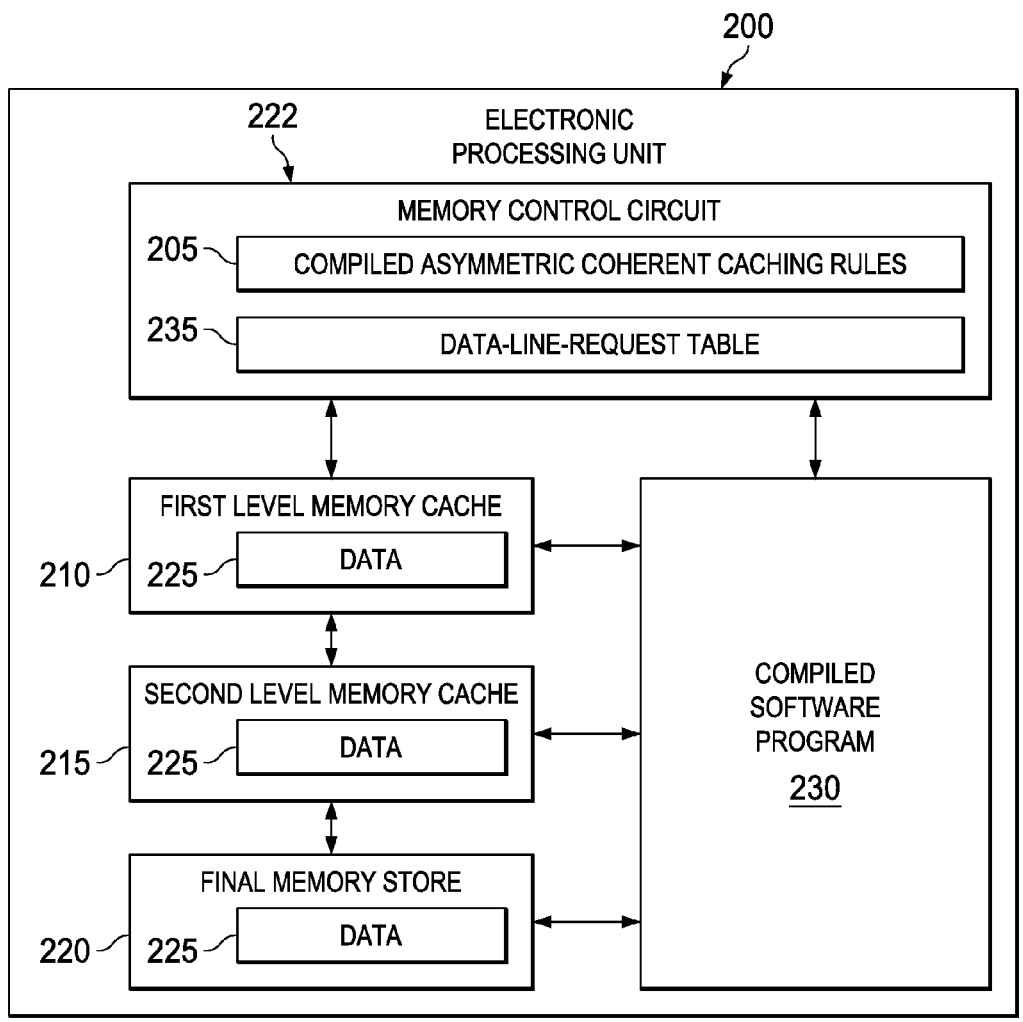

FIG. 2 illustrates a block diagram of example embodiments of an electronic processing unit for data-parallel computations constructed according to the principles of the present disclosure; and FIG. 3 illustrates a block diagram of example embodiments of a computing system for data-parallel computations constructed according to the principles of the present disclosure.

DETAILED DESCRIPTION

The methods, processors and systems disclosed herein embody an asymmetry cache coherence architecture that use protocols based on an assumption of heterogeneity between the electronic processing units of a multiprocessor system. In particular, a set of asymmetric coherent caching rules disclosed herein can be implemented on a first electronic processor unit (e.g., a graphical processing unit, GPU) that can perform a large number of parallel computations on data often at a slower rate than a second electronic processor unit's computing rate (e.g., a central processing unit, CPU). Implementation of the set of rules on the first electronic processor unit facilitates the second first electronic processor unit's ability to perform computations at or near its optimal speed by avoiding or reducing latency.

The asymmetric coherent caching rules can help the second processor's computing speed to not be slowed down by delay times, or latency, associated with fetching data that otherwise, e.g., using symmetric coherent caching rules, may be stored in the memory cache of the first processor. The avoided latency associated with fetching data from the memory of the first processor back to the second processor could equal hundreds or thousand of clock cycles of the second processor, during which time the second processor could be idling.

In accordance with the set of rules, because none of the data used by the both first and second processors are stored in the memory of the first processor, the first processor can be configured to fetch data from the memory of the second processor. Surprisingly, the delay times or latency associated the first processor's fetching of data from the second processors memory are not substantially detrimental to first processor's performance.

The first processor can be more tolerant than the second processor to the latency associated with fetching because the first processor is configured to perform multiple data-parallel computations. During the latency associated with fetching from the memory of the second processor, the first processor can perform other data-parallel computations that do not require the particular data being fetched from the second processor. Additionally, to reduce the number of fetches, the first processor can be configured, according to the set of rules, to fetch and make a copy, in its own memory, data from the second processor's memory.

Embodiments illustrating these and other features of asymmetric coherent caching rules of the disclosure are presented below. FIGS. 1A and 1B presents a flow diagram of example embodiments of a method 100 of caching memory in electronic processing units according to the principles of the present disclosure. FIG. 2 illustrates a block diagram of example embodiments of an electronic processing unit 200 constructed according to the principles of the present disclosure. FIG. 3 illustrates a block diagram of example embodiments of a computing system 300 constructed according to the principles of the present disclosure.

One embodiment is a method of caching data in the memory of electronic processor units. Turning to FIGS. 1A and 1B, with continuing reference to FIGS. 2-3, the method 100 comprises, in step 105, compiling, in a first electronic processor unit 200 configured to perform data-parallel computation, a set of asymmetric coherent caching rules 205.

As illustrated in FIG. 2 the first processor unit 200 can comprise a first level memory cache 210, a second level memory cache 215, a final memory store 220 and a memory control circuit 222 compiled with the set of rules 205.

The term, first level memory cache of the first electronic processor unit (e.g., first level memory cache 210 of the processor unit 200 depicted in FIG. 2) as used herein, refers to random access memory (RAM) located on the first electronic processor unit (e.g., on-chip first electronic processor unit RAM) and directly connected to a core of the first electronic processor unit. The term, second level memory cache of the first electronic processor unit (e.g., second level memory cache 215 of the processor unit 200 depicted in FIG. 2) as used herein, refers to on-chip first electronic processor unit RAM that is different than the on-chip first electronic processor unit RAM of the first level memory cache and is in data communication with the first level memory cache. The term, final memory store of the first electronic processor unit (e.g., final memory store 220 of the processor unit 200 depicted in FIG. 2) as used herein, refers to RAM not located on the first electronic processor unit (e.g., off-chip first electronic processor unit RAM) nor on the second electronic processor unit and in data communication with the first electronic processor unit. One of ordinary skill in the art would understand that first and second level memory caches are configured to hold portions of data from the final memory store that has recently been used by the processor.

The set of rules 205 can configure the first electronic processor unit 200, in step 110, inoperable to cache, in the second level memory cache 215 of the first electronic processor unit 200, data 225 whose home location is in a final memory store of a second electronic processor unit (e.g., a final memory store 310 of the second processor unit 305 depicted in FIG. 3).

The set of rules 205 can configure the first processor 200, in step 115, operable to cache, in the second level memory cache 215 of the first electronic processor unit 200, the data 225 whose home location is in the final memory store 220 of the first electronic processor unit 200.

The set of rules 205 can configure the first processor 200, in step 120, operable to cache, in the first level memory cache 210 of the first electronic processor unit 200, the data 225, regardless of a home location of the data 225.

The term, final memory store of the second electronic processor unit as used herein, refers to off-chip second electronic processor unit RAM not located on the second electronic processor unit (e.g., processor unit 305) nor on the first electronic processor unit (e.g., processor unit 200) and in data communication with the second electronic processor unit.

The term, home location (or homed) as used herein, refers to a location of a portion of the data in one of the final memory store of the first electronic processor unit (e.g., data 225 homed in final memory store 220) or the final memory store of the second electronic processor unit (e.g., data 225 homed in final memory store 310).

One skilled in the art would understand that data is stored in computer memory in the form of cache lines where each cache line has a unique address, e.g., an address corresponding to a location of a portion of the data in the final memory store of the first electronic processor unit or in the final memory store of the second electronic processor unit. Thus data transiently located in a cache memory (e.g., cache memory of the first or second electronic processor unit) has an associated address that points to a home location in one of the final memory store of the first electronic processor unit or in the final memory store of the second electronic processor unit.

In some embodiments, the method 100 further comprises, in step 125, compiling a software program 230 to run on the first electronic processor unit 200 in compliance with the set of asymmetric coherent caching rules 205. As part of compiling the software program (step 125) the first electronic processor unit 200 can be configured, in step 130, to invalidate an unmodified portion of the data 225 in the first level memory cache 210 of the first electronic processor unit 200 when required by rules of data-race-free programming applied by the software program 230.

The term, invalidate an unmodified portion of the data as used herein, means clearing the unmodified portion of data from a first level memory cache 210 of an electronic processor unit (e.g., data 225 from the first level memory cache 210 of the first electronic processor unit 200) as well understood by those skilled in the pertinent art.

The term, data-race-free programming as used herein, refers to synchronization rules implemented by software programs to forbid data races such as defined in Section 4 of "Weak Ordering: A New Definition" by Adve and Hill (ACM SIGARCH Computer Architecture News-Special Issue: Proceedings of the 17th annual international symposium on Computer Architecture, Volume 18 Issue 2SI, June 1990 Pages 2-14) which is incorporated by reference herein in its entirety.

In some embodiments, as part of compiling the software program (step 125) the first electronic processor unit 200 can be configured, in step 135, to write a portion of the data 225 back to home locations in the final memory store 220 of the first electronic processor unit 200 or home locations in the final memory store 310 of the second electronic processor unit 305, when the portion of the data 225 is modified by the software program 230.

In some embodiments, as part of compiling the software program (step 125) the first electronic processor unit 200 can be configured, in step 140, to maintain a record of a portion of the data 215 which is homed by the first electronic processor unit 200 and which is cached in a memory cache of the second electronic processor unit (e.g., memory cache 315 of the second electronic processor unit 305, depicted in FIG. 3).

The term, memory cache of the second electronic processor unit as used herein, refers to on-chip second electronic processor unit RAM located on the second electronic processor unit. The memory cache of the second electronic processor unit can include separate RAM corresponding to first, second, or lower, levels of memory caches on the second electronic processor unit.

In some embodiments, as part of compiling the software program (step 125) the first electronic processor unit 200 can be configured, in step 145, to request the second electronic processor unit 305 to forward a copy of a portion of the data 215 that is modified by the software program 230, back to the first electronic processor unit 200 without flushing the modified portion of the data 215 from a memory cache of the second electronic processor unit (e.g., memory cache 315 of the second electronic processor unit 305 depicted in FIG. 3), where the portion of the data 215 is homed by the first electronic processor unit 200.

In some embodiments, as part of compiling the software program (step 125) the first electronic processor unit 200 can be configured, in step 150, to instruct the second electronic processor unit 305 to flush a portion of the data 215 from a memory cache of the second electronic processor unit (e.g., memory cache 315 of the second electronic processor unit 305 depicted in FIG. 3) when the software program 230 causes the first electronic processor unit 200 to update the portion of the data 215, where the portion of the data 215 is homed by the first electronic processor unit 200.

The term, flush or flushing as used herein, means return the portion of data 215 to the first electronic processor unit 200, if modified, and invalidate the portion of the data 215 in the memory cache 315 of the second electronic processor unit 305.

One skilled in the pertinent art would be familiar with how cache lines of data can be stored in data-line request tables. To facilitate the efficient execution of the set of asymmetric coherent caching rules 205, in some embodiments of the method 100 the set of asymmetric coherent caching rules 205, when compiled in the first electronic processor unit 200, further configures, in step 155, the first electronic processor unit 200 to be operable to consult a data-line request table 235 stored in the first electronic processor unit (e.g., stored in the memory control circuit 222 of first electronic processor unit 200). As part of step 155, the set of asymmetric coherent caching rules 205 can further configure the first electronic processor unit 200, in step 160, to only read the portion of data stored in a memory cache (e.g., memory cache 315) of the second electronic processor unit 305 if the portion of the data 215 sought by the first electronic processor unit 200 is of record in the data-line request table 235.

Another embodiment is an electronic processing unit for data-parallel computation. As illustrated in FIG. 2, with the electronic processing unit 200, comprising the first level memory cache 210, second level memory cache 215, final memory store 220 and memory control circuit 222. The memory control circuit 222 can be compiled with the set of asymmetric coherent caching rules 205 such that the electronic processing unit 200 can be configured to perform in accordance with steps 110, 115, 120 and 150 as described herein in the context of FIGS. 1A and 1B. A software program 230 can be compiled to run on the processing unit 200 in compliance with the set of asymmetric coherent caching rules 205 such that the processing unit 200 can be configured to perform in accordance with steps 125-145 as described herein in the context of FIGS. 1A and 1B.

In some embodiments, the electronic processing unit 200 is configured as a GPU. One skilled in the pertinent arts would be familiar with the component parts of the GPU to facilitate performing data-parallel computations (e.g., load, store and texture operations) in software programs 230 for, e.g., rendering graphical data and communicating with other processing units. Embodiments of the electronic processing unit 200, however, are not limited to graphical processing configurations. For instance, the processing unit 200 may be configured for any non-graphical or general purpose computing application that can take advantage of data-parallel algorithms to perform computations on data, involving matrix and vector operations.

Another embodiment is a computing system for data-parallel computations. Turning to FIG. 3, with continuing reference to FIGS. 1A-2, the computing system 300 comprises a first electronic processing unit 200 configured to perform data-parallel computations in accordance with the set of asymmetric coherent caching rules 205 such as discussed herein in the context of FIGS. 1A-2.

In some embodiments the system 300 further includes a second electronic processing unit 305, and a data interconnection link 320 configured to transfer the data 215 between the parallel processing unit 200 and the central processing unit 305. In some embodiments, the second electronic processing unit 315 can be configured as a CPU. Embodiment of the second electronic processing unit 305 can include a memory control circuit 340 that is configured to track and cache data 225 in the final memory store 310 and the memory cache 315 of the processing unit 305 in accordance with the set of asymmetric coherent caching rules 205.

Those skilled in the art to which this application relates will appreciate that other and further additions, deletions, substitutions and modifications may be made to the described embodiments.

What is claimed is:
1. A method of caching data in the memory of electronic processor units, comprising:
compiling, in a first electronic processor unit configured to perform data-parallel computations, a set of asymmetric coherent caching rules, wherein the set of rules configure the first electronic processor unit to be:

inoperable to cache, in a second level memory cache of the first electronic processor unit, data whose home location is in a final memory store of a second electronic processor unit, operable to cache, in the second level memory cache of the first electronic processor unit, the data whose home location is in a final memory store of the first electronic processor unit, and operable to cache, in a first level memory cache of the first electronic processor unit, the data, regardless of a home location of the data.

2. The method of claim 1, compiling a software program to run on the first electronic processor unit in compliance with the set of asymmetric coherent caching rules such that the first electronic processor unit is configured to invalidate an unmodified portion of the data in the first level memory cache of the first electronic processor unit when required by rules of data-race-free programming applied by the software program.

3. The method of claim 1, compiling a software program to run on the first electronic processor unit in compliance with the set of asymmetric coherent caching rules such that the first level memory cache of the first electronic processor unit is configured to write a portion of the data back to home locations in the final memory store of the first electronic processor unit or home locations in the final memory store of the second electronic processor unit, when the portion of the data is modified by the software program.

4. The method of claim 1, compiling a software program to run on the first electronic processor unit in compliance with the set of asymmetric coherent caching rules such that the first electronic processor unit maintains a record of a portion of the data which is homed by the first electronic processor unit and which is cached in a memory cache of the second electronic processor unit.

5. The method of claim 1, compiling a software program to run on the first electronic processor unit in compliance with the set of asymmetric coherent caching rules such that the first electronic processor unit requests the second electronic processor unit to forward a copy of a portion of the data that is modified, back to the first electronic processor unit without invalidating the modified portion of the data from a memory cache of the second electronic processor unit, wherein the portion of the data is homed by the first electronic processor unit.

6. The method of claim 1, compiling a software program to run on the first electronic processor unit in compliance with the set of asymmetric coherent caching rules such that the first electronic processor unit instructs the second electronic processor unit to flush a portion of the data from a memory cache of the second electronic processor unit when the software program causes the first electronic processor unit to update the portion of the data, wherein the portion of the data is homed by the first electronic processor unit.

7. The method of claim 1, wherein the set of asymmetric coherent caching rules, when compiled in the first electronic processor unit, further configures the first electronic processor unit to be operable to consult a data-line request table stored in the first electronic processor unit and to only read a portion of the data stored in a memory cache of the second electronic processor unit if the portion of the data sought by the first electronic processor unit is of record in the data-line request table.

8. The method of claim 1, wherein the first electronic processor unit is a graphical processing unit and the second electronic processor unit is a central processing unit.

9. An electronic processing unit for data-parallel computations, comprising:
    a first level memory cache;
    a second level memory cache;
    a final memory store; and
    a memory control circuit compiled with a set of asymmetric coherent caching rules, wherein the set of rules configure the electronic processing unit to be:
        inoperable to cache, in the second level memory cache, data whose home location is in a final memory store of a second electronic processing unit,
        operable to cache, in the second level memory cache, the data whose home location is in the final memory store, and
        operable to cache, in the first level memory cache, the data, regardless of a home location of the data.

10. The unit of claim 9, further including a software program compiled to run on the electronic processing unit in compliance with the set of asymmetric coherent caching rules such that the electronic processing unit is configured to invalidate an unmodified portion of the data in the first level memory cache of the electronic processing unit when required by rules of data-race-free programming applied by the software program.

11. The unit of claim 9, further including a software program compiled to run on the electronic processing unit in compliance with the set of asymmetric coherent caching rules such that the first level memory cache of the electronic processing unit is configured to write a portion of the data back to home locations in the final memory store of the electronic processing unit or home locations in the final memory store of the second electronic processing unit, when the portion of the data is modified by the software program.

12. The unit of claim 9, further including a software program compiled to run on the electronic processing unit in compliance with the set of asymmetric coherent caching rules such that the electronic processing unit is configured to maintain a record of a portion of the data which is homed by the electronic processing unit and which is cached in a memory cache of the second electronic processing unit.

13. The unit of claim 9, further including a software program compiled to run on the electronic processing unit in compliance with the set of asymmetric coherent caching rules such that the electronic processing unit is configured to request the second electronic processing unit to forward a copy of a portion of the data that is modified back to the electronic processing unit without invalidating the modified portion of the data from a memory cache of the second electronic processing unit, wherein the portion of the data is homed by the electronic processing unit.

14. The unit of claim 9, further including a software program compiled to run on the electronic processing unit in compliance with the set of asymmetric coherent caching rules such that the electronic processing unit is configured to instruct the second electronic processing unit to flush a portion of the data from a memory cache of the second electronic processing unit when the software program causes the electronic processing unit to update the portion of the data, wherein the portion of the data is homed by the electronic processing unit.

15. The unit of claim 9, further including a software program compiled to run on the electronic processing unit in compliance with the set of asymmetric coherent caching rules such that the electronic processing unit is configured to be operable to consult a data-line request table stored in the electronic processing unit and to only read a portion of the data stored in a memory cache of the second processing unit if the portion of the data sought by the electronic processing unit is of record in the data-line request table.

16. The unit of claim 9, wherein the first electronic processing unit is a graphical processing unit.

17. The unit of claim 9, wherein the second electronic processing unit is a central processing unit.

18. A computing system for data-parallel computations, comprising:
- an electronic parallel processing unit, wherein the electronic parallel processing unit includes:
  - a first level memory cache;
  - a second level memory cache;
  - a final memory store; and
  - a memory control circuit compiled with a set of asymmetric coherent caching rules, wherein the set of rules configure the parallel processing unit to be:
    - inoperable to cache, in the second level memory cache, data whose home location is in a final memory store of an electronic central processing unit,
    - operable to cache in the second level memory cache, the data whose home location is in the final memory store of the parallel processing unit, and
    - operable to cache, in the first level memory cache, the data, regardless of a home location of the data.

19. The system of claim 18, wherein a software program compiled to run on the parallel processing unit and the central processing unit in compliance with the set of asymmetric coherent caching rules such that the parallel processing unit is configured to instruct the central processing unit to flush a portion of the data from a memory cache of the central processing unit when the software program causes the parallel processing unit to update the portion of the data, wherein the portion of the data is homed by the parallel processing unit.

20. The system of claim 18, further including:
- the electronic central processing unit; and
- a data interconnection link configured to transfer the data between the parallel processing unit and the central processing unit.

* * * * *

UNITED STATES PATENT AND TRADEMARK OFFICE
CERTIFICATE OF CORRECTION

PATENT NO. : 9,727,463 B2  
APPLICATION NO. : 14/882617  
DATED : August 8, 2017  
INVENTOR(S) : John Danskin Page 1 of 1

It is certified that error appears in the above-identified patent and that said Letters Patent is hereby corrected as shown below:

In the Specification

In Column 3, Line 15, after "data used by" delete "the both" and please insert --both the--

In Column 4, Line 60, after "data-race-free" delete "programming" and please add --programing--

In Column 5, Line 1, after "data-race-free" delete "programming" and please add --programing--

In the Claims

In Column 7, Line 19, after "data-race-free" delete "programming" and please add --programing--

In Column 7, Line 42, after "modified" delete ","

In Column 8, Line 23, after "data-race-free" delete "programming" and please add --programing--

Signed and Sealed this  
Twentieth Day of February, 2018

Andrei Iancu  
*Director of the United States Patent and Trademark Office*